US009626984B2

(12) United States Patent
Tang et al.

(10) Patent No.: US 9,626,984 B2
(45) Date of Patent: Apr. 18, 2017

(54) INSTANT MESSAGING METHOD AND SYSTEM, COMMUNICATION INFORMATION PROCESSING METHOD, TERMINAL, AND STORAGE MEDIUM

(71) Applicant: TENCENT TECHNOLOGY (SHENZHEN) COMPANY LIMITED, Shenzhen (CN)

(72) Inventors: Mu Tang, Shenzhen (CN); Yongyu Dai, Shenzhen (CN); Bo Ye, Shenzhen (CN); Yunguang Luo, Shenzhen (CN); Jinbin Cai, Shenzhen (CN); Rui Song, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/731,373

(22) Filed: Jun. 4, 2015

(65) Prior Publication Data
US 2015/0269928 A1    Sep. 24, 2015

Related U.S. Application Data

(63) Continuation of application No. PCT/CN2013/086132, filed on Oct. 29, 2013.

(30) Foreign Application Priority Data

Dec. 4, 2012   (CN) ........................... 2012-10510615

(51) Int. Cl.
*G10L 21/003*    (2013.01)
*G10L 13/033*    (2013.01)
(Continued)

(52) U.S. Cl.
CPC .......... *G10L 21/003* (2013.01); *G10L 13/033* (2013.01); *H04L 51/04* (2013.01);
(Continued)

(58) Field of Classification Search
CPC ... G10L 21/003; G10L 21/007; G10L 21/013; G10L 21/01; G10L 2021/0135
See application file for complete search history.

(56) References Cited

U.S. PATENT DOCUMENTS

2002/0152074 A1* 10/2002 Junqua .................... G10L 13/04
704/260
2003/0115063 A1* 6/2003 Okunoki ............... G10L 13/033
704/266
(Continued)

FOREIGN PATENT DOCUMENTS

CN           1639738 A       7/2005
CN           1936889 A       3/2007
(Continued)

OTHER PUBLICATIONS

The World Intellectual Property Organization (WIPO) International Search Report for PCT/CN2013/086132 Jan. 30, 2014.

*Primary Examiner* — Douglas Godbold
(74) *Attorney, Agent, or Firm* — Anova Law Group, PLLC

(57) ABSTRACT

The present disclosure provides an instant messaging method and system, a communication information processing method, a terminal, and a storage medium. The instant messaging method includes: receiving, by a first terminal, a sound recorded by a user, and performing sound change processing on the sound recorded by the user to provide a changed sound; sending, by the first terminal, the changed sound after the sound change processing to a second terminal for the second terminal to synthesize the received, changed sound that has gone through the sound change
(Continued)

processing with a pre-stored animation, so as to form analog image data and to play the analog image data. The present disclosure has advantages including rich communication forms, convenient operation, and high network transmission efficiency.

16 Claims, 6 Drawing Sheets

(51) Int. Cl.
*H04L 12/58* (2006.01)
*G10L 25/57* (2013.01)

(52) U.S. Cl.
CPC .............. *G10L 25/57* (2013.01); *H04L 51/06* (2013.01); *H04L 51/36* (2013.01)

(56) References Cited

U.S. PATENT DOCUMENTS

| | | | |
|---|---|---|---|
| 2003/0163315 A1* | 8/2003 | Challapali | G06T 13/40 704/260 |
| 2007/0168359 A1* | 7/2007 | Jacob | A63F 13/12 |
| 2009/0244098 A1* | 10/2009 | Tateishi | G06T 3/0093 345/646 |
| 2010/0198600 A1* | 8/2010 | Masuda | G10L 13/033 704/278 |
| 2010/0215289 A1* | 8/2010 | Pradeep | G06T 3/0093 382/293 |
| 2010/0235166 A1* | 9/2010 | Bardino | G10L 21/04 704/207 |

FOREIGN PATENT DOCUMENTS

| | | |
|---|---|---|
| CN | 101465816 A | 6/2009 |
| CN | 102270352 A | 12/2011 |

\* cited by examiner

INSTANT MESSAGING METHOD AND SYSTEM, COMMUNICATION INFORMATION PROCESSING METHOD, TERMINAL, AND STORAGE MEDIUM

RELATED APPLICATION

This patent application is a continuation of PCT Application No. PCT/CN2013/086132, filed on Oct. 29, 2013, which claims priority to Chinese Patent Application No. 201210510615.X, filed with the Chinese Patent Office on Dec. 4, 2012, the entire contents of all of which are incorporated by reference.

FIELD OF THE TECHNOLOGY

The present disclosure generally relates to the field of Internet technologies and, more particularly, relates to an instant messaging method and system, a communication information processing method, a terminal, and a storage medium.

BACKGROUND OF THE DISCLOSURE

With the rapid development of science and technology and incessant changes in communication technologies, mobile communication terminals have been widely applied in daily life and used by people, and people may call each other or send short message service messages to each other with a mobile communication terminal and via a network, which greatly shortens the distance between people and further brings great convenience for connections and provides information exchange between people.

Currently, communication manners of network chatting include use of text, an emoticon (including a system-contained emoticon and a user-defined emoticon), a picture (including graffiti), a voice message, a text message, and a video (including video chatting and offline video). Although there are numerous forms for communication, there is still a certain limitation unable to fully meet needs of a user. The text is a most widely used chatting manner, but its expressive form is simplex and hard to express a real feeling and mood of a user at that time, thereby causing that misunderstanding frequently happens during chatting. Same as the text chatting manner, the voice message and the text message also have the disadvantage as a simplex expressive form. Uses of the picture and the emoticon may enrich expression of user emotion; however, during use of the picture or the emoticon, a user often needs to search a large number of pictures or emoticons for a picture or an emoticon that suits a current state of the user, which results in inconvenient operation. The video chatting can truly present videos of both chatting parties; however, transmission of video data needs to occupy large bandwidth and consume a long sending time and high traffic costs, and in a case in which a network state is not good or the bandwidth is narrow, video effects are unsatisfactory.

Therefore, there is a need to solve technical problems in the Internet and computer technology to provide improved chatting manner.

SUMMARY

Objectives of the present disclosure are to provide an instant messaging method and system, a communication information processing method, a terminal, and a storage medium, so as to solve problems of a simplex expressive form, inconvenient operation, and large traffic of an existing instant chatting manner.

The present disclosure provides an instant messaging method, including: receiving, by a first terminal, a sound recorded by a user, performing, by the first terminal, sound change processing on the sound recorded by the user to provide a changed sound; and sending, by the first terminal, the changed sound to a second terminal for the second terminal to synthesize the changed sound with a pre-stored animation in the second terminal to form analog image data and to play the analog image data.

The present disclosure further provides a communication information processing method, including: receiving a changed sound after sound change processing from a to-be-communicated party; synthesizing the changed sound with a pre-stored animation, so as to form analog image data; and playing the analog image data.

The present disclosure further provides an instant messaging system, including at least two terminals connected to each other via a network. Each terminal includes: a storage module, configured to store multiple animations; a sound recording module, configured to receive a sound recorded by a user; a sound change module, configured to perform sound change processing on the sound recorded by the user to provide a changed sound; a communication module, configured to send the changed sound to another terminal or receive a changed sound from another terminal; a synthesizing module, configured to synthesize the sound from the another terminal with the animation stored in the storage module, so as to form analog image data; and a playing module, configured to play the analog image data.

Compared with the existing technology, the present disclosure has the following exemplary beneficial effects.

(1) The present disclosure provides an entirely inventive communication medium, which uses an expression animation in combination with a personalized sound, and is shown in the form of an analog image by intelligent processing, which can vividly and correctly reflect a state and mood of a user during communication.

(2) The present disclosure automatically matches a sound recorded by the user with an image selected by the user to form analog image data, which simplifies user operations.

(3) The present disclosure can transmit a sound that has gone through sound change processing only in a network, and then correspondingly match a received sound with a local animation, which greatly saves traffic during network transmission, shortens a sending response time, and improves communication efficiency.

Certainly, any product for implementing the present disclosure does not necessarily achieve all the advantages described above at the same time.

The foregoing description merely briefly describes the technical solution of the present disclosure. To more clearly understand the technical means of the present disclosure, the technical means of the present disclosure can be implemented according to content of the present disclosure. Moreover, to make the foregoing and other objectives, characteristics, and advantages of the present disclosure more comprehensible, preferred embodiments are described in detail below with reference to the accompanying drawings. Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure. The embodiments of the present invention are described below with reference to the accompanying drawings. In these accompanying drawings.

DESCRIPTION OF EMBODIMENTS

To further explain the technical means used in the present disclosure for achieving the intended objectives and the efficacy thereof, specific implementation manners, methods, steps, and efficacy of an instant messaging method and system, a communication information processing method, a terminal, and a storage medium provided in the present disclosure are described in detail below with reference to the accompanying drawings and preferred embodiments.

The foregoing and other technical content, features, and efficacy of the present disclosure will be clearly presented in the detailed description of the preferred embodiments with reference to the drawings. Through the description of the specific implementation manners, the technical means used in the present disclosure for achieving the intended objectives and the efficacy can be understood more deeply and specifically. However, the accompanying drawings are just used for reference and description and not intended to limit the present disclosure.

Figure 1:
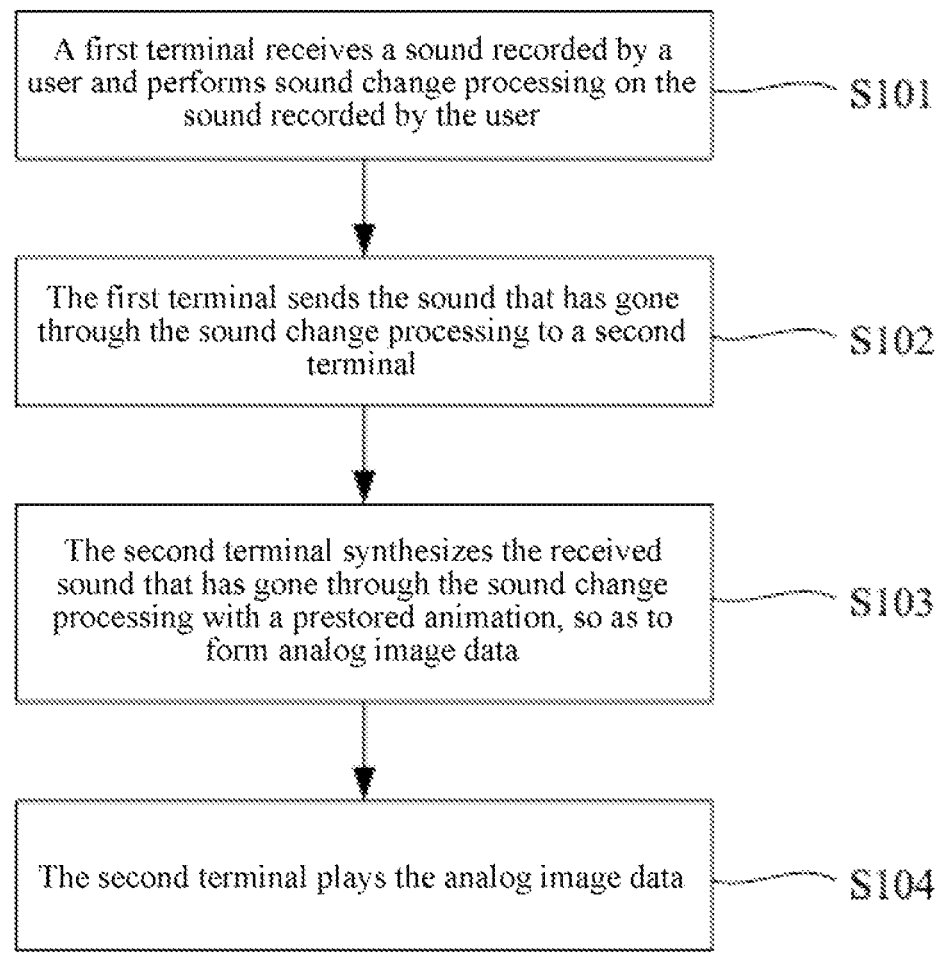
FIG. 1 is a flowchart of an instant messaging method according to an embodiment of the present invention.

The present disclosure provides an entirely new communication medium, which uses an entirely new communication manner including an expression animation and also including a sound, and is shown in the form of an analog image by some intelligent processing. Referring to FIG. 1, FIG. 1 is a flowchart of an instant messaging method according to an embodiment of the present invention. The method includes the following steps:

S101: A first terminal receives a sound recorded by a user and performs sound change processing on the sound recorded by the user to provide a changed sound.

The sound may be recorded by the user in real time by using a microphone, or may also be prerecorded and then directly transmitted to the first terminal. After the sound is recorded by the user, an audio processing library (Soundtouch) may be used to process the sound. Soundtouch mainly implements three functions of varying a rate, varying a tone, and varying a rate and tone at the same time, can perform a real-time operation on a media stream, and can also perform an operation on an audio file. In the present disclosure, three parameters of Soundtouch, such as, a rate, tempo, and pitch may be adjusted, thereby changing the sound of the user to simulate some special sounds. For example, if the parameter pitch is adjusted to 0.8, a low and slow sound of cattle and bears can be simulated; and if the parameter pitch is adjusted to 1.2, a loud sound of chicken can be simulated. The sound becomes more personalized and vivid after the sound change processing, and the user can simulate a suitable sound according to a current mood or state, which makes a communication process more colorful rather than boring.

S102: The first terminal sends the changed sound that has gone through the sound change processing to a second terminal.

The present disclosure is a communication manner of combining the sound and the animation. However, if the first terminal directly sends complete animation motions and sounds to the second terminal, traffic may be wasted and a long sending response time may also be needed. Therefore, in this embodiment, it is just required to send the changed sound after the sound change processing to the other party, and the other party performs a corresponding match between the received sound and a local animation to locally form a complete analog image of the animation motions plus sounds. This technical logic solves the problem that a longer time and more traffic are needed during sending of the complete animations plus sounds.

S103: The second terminal synthesizes the received, changed sound that has gone through the sound change processing with a pre-stored animation, so as to form analog image data.

There may be multiple animations pre-stored by the second terminal, and the animation synthesized with the sound may be randomly selected, or may also be selected by the user. The synthesized sound and animation have consistency, so that the current mood of the user can be vividly expressed. Therefore, a volume or tone of the sound can be used as a reference to find a suitable animation by matching. For example, when the sound volume of the user is large and the tone is high, an animation with an exaggerated motion can be selected; and when the sound volume of the user is small and the tone is low, an animation consistent with this style can be selected, so as to simulate a real scenario during communication as closely as possible.

During specific implementation, a matching rule may be defined first: it is assumed that one of the animations can be divided into N motion pictures and a motion style of each motion picture is different from others; if a corresponding animation is selected according to the volume, a volume upper limit Volmax can be set; in addition, volumes from 0 to Volmax are divided into N sections with the same number as the motion pictures and are numbered from 1 to N, and then the N motion pictures are each made to correspond to a different volume, where a motion picture with a smaller motion range corresponds to a smaller volume.

When the sound that has gone through the sound change processing (i.e., the changed sound) is matched with a suitable motion picture, the sound that has gone through the sound change processing can be divided into multiple time periods, and an average value of volumes during each time period is sampled. Each average value of volumes may be equal or the closest to a volume point in the foregoing defined rule, and in this way, a motion picture corresponding to each average value of volumes can be found. After all motion pictures corresponding to average values of volumes during each time period are found, these motion pictures can be combined into a continuous animation, and the motion style of this animation coincides with a volume of the sound that has gone through the sound change processing.

Figure 2:
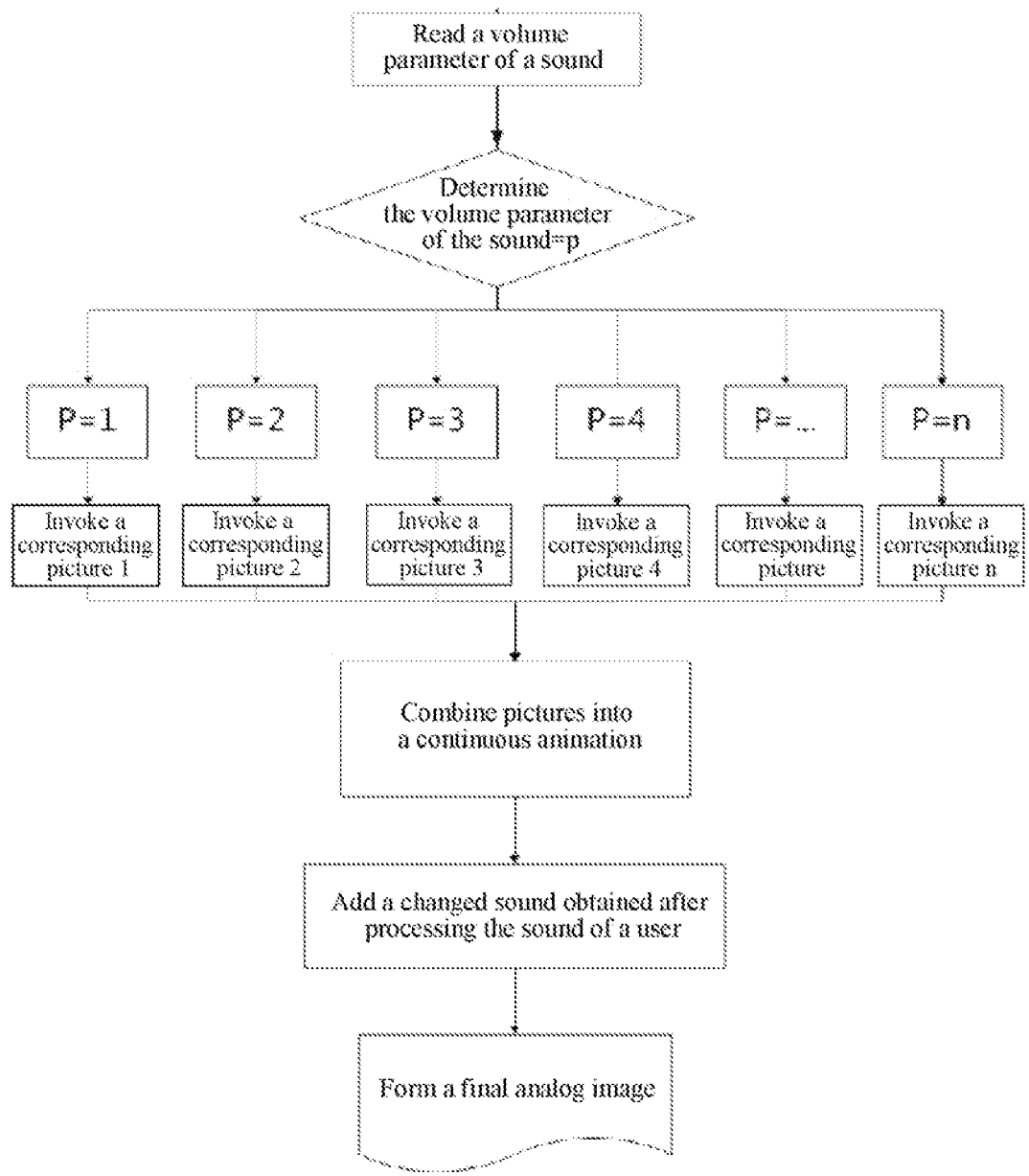
FIG. 2 is a schematic diagram of a process of forming analog image data according to an embodiment of the present invention.

At last, the sound that has gone through the sound change processing is incorporated with the animation to form the analog image data. In this way, animation effects and sound effects contained in the obtained analog image data can vividly and correctly reflect the state and mood of the user. As shown in FIG. 2, FIG. 2 is a schematic diagram of a process, of forming analog image data, described above, where n is the number of the time periods obtained by dividing the sound that has gone through the sound change processing.

S104: The second terminal plays the analog image data.

A process of playing the analog image data is a process of playing the sound that has gone through the sound change processing and the corresponding animation at the same time. Different from an existing communication manner, the present disclosure vividly presents a real state of a user performing communication. However, a speed and tone of a sound of each person are different from others. Therefore, synchronization and a match between a sound and a motion need to be achieved when the analog image data is played. For example, a change in a mouth shape is basically synchronous with the speaking speed of a user when the user speaks, and the speed of a body motion also needs to be synchronous with and match the speaking speed.

During specific implementation, when the sound that has gone through the sound change processing is played, an average value of volumes or tones during each time period may be sampled at the same time, and then a corresponding motion picture is synchronously displayed according to the sampled average value of volumes or tones during each time period. In this way, a match between the sound and the motion may be achieved.

Besides, in start and end phases of playing the analog image data, some fixed animation motions can be added. These motions are irrelevant to the sound of the user and are just animation motions that fixedly exist to make the animation interesting.

Figure 3:
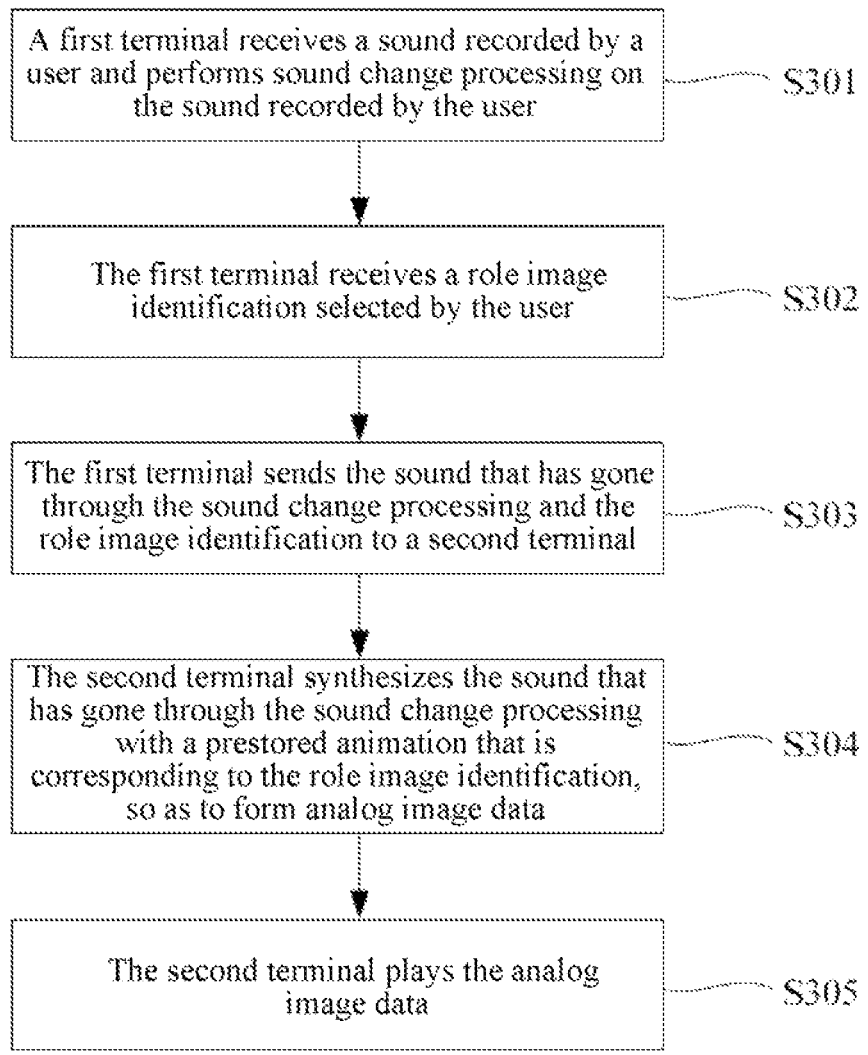
FIG. 3 is a flowchart of another instant messaging method according to an embodiment of the present invention.

Referring to FIG. 3, FIG. 3 is a flowchart of another instant messaging method according to an embodiment of the present invention. The method includes the following steps:

S301: A first terminal receives a sound recorded by a user and performs sound change processing on the sound recorded by the user to provide a changed sound.

S302: The first terminal receives a role image identification selected by the user.

S303: The first terminal sends the sound that has gone through the sound change processing and the role image identification to a second terminal.

S304: The second terminal synthesizes the sound that has gone through the sound change processing with a pre-stored animation that corresponds to the role image identification, so as to form analog image data.

S305: The second terminal plays the analog image data.

Embodiment 2 differs from Embodiment 1 in that: the user can select an animation image that he wants to show to the other party by using a role image identification, where each role image identification corresponds to one pre-stored animation image, which also makes communication content more colorful.

In the communication methods in embodiment 1 and embodiment 2, a first terminal sends communication information to a second terminal and the second terminal plays the communication information, so as to describe constitution of the communication information and a communication manner. However, the communication manner is not limited hereto, that is, alternatively, the second terminal may also send communication information to the first terminal and the first terminal plays the communication information.

Figure 4:
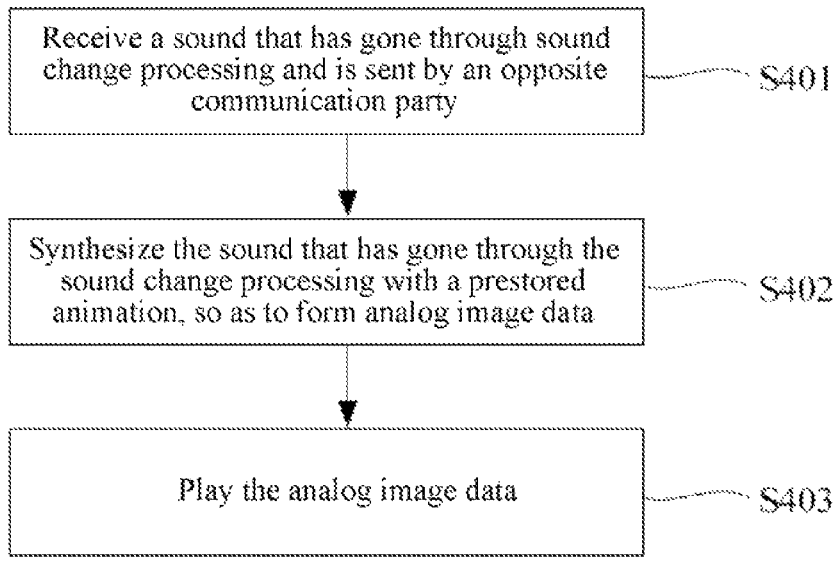
FIG. 4 is a flowchart of a communication information processing method according to an embodiment of the present invention.

The present disclosure further provides a communication information processing method, which is a method for processing communication information formed by combining animation effects and sound effects. Referring to FIG. 4, the method includes the following steps:

S401: Receive a sound that has gone through sound change processing from a to-be-communicated party.

The to-be-communicated party described herein may be a user terminal or a communication platform. The sound that has gone through the sound change processing may be recorded by the user in real time by using a microphone or may be prerecorded. The sound may be processed by using an audio processing library (Soundtouch), and the sound of the user may be changed by adjusting three parameters of Soundtouch, such as, a rate, tempo, and pitch to simulate some special sounds. For example, if the parameter pitch is adjusted to 0.8, a low and slow sound of cattle and bears can be simulated; and if the parameter pitch is adjusted to 1.2, a loud sound of chicken can be simulated. The sound may become more personalized and vivid after the sound change processing, and the user can simulate a suitable sound according to a current mood or state, which makes a communication process more colorful rather than boring.

The present disclosure is a communication manner of combining the sound and the animation. However, if the to-be-communicated party directly sends complete animation motions and sounds, more traffic may be wasted and a long sending response time may also be needed. Therefore, in this embodiment, it is just required to receive the sound and then perform a corresponding match between the received sound and a local animation to locally form a complete analog image of the animation motions plus sounds. This technical logic solves the problem that a longer time and more traffic are needed during sending of the complete animations plus sounds.

S402: Synthesize the sound with a pre-stored animation, so as to form analog image data.

There may be multiple pre-stored animations described herein, and the animation synthesized with the sound may be randomly selected from the multiple animations, or may also be selected by the user. The synthesized sound and animation have consistency, so that the current mood of the user can be vividly expressed. Therefore, a volume or tone of the sound can be used as a reference to find a suitable animation by matching, so as to simulate a real scenario during communication as closely as possible.

During specific implementation, a matching rule may be defined first: it is assumed that one of the animations can be divided into N motion pictures and a motion style of each motion picture is different from others; if a corresponding animation is selected according to the volume, a volume upper limit Volmax can be set; in addition, volumes from 0 to Volmax are divided into N sections with the same number as the motion pictures and are numbered from 1 to N, and then the N motion pictures are each made to correspond to a different volume, where a motion picture with a smaller motion range corresponds to a smaller volume.

When the sound that has gone through the sound change processing is matched with a suitable motion picture, the sound that has gone through the sound change processing can be divided into multiple time periods, and an average value of volumes during each time period is sampled. Each average value of volumes may be equal or the closest to a volume point in the foregoing defined rule, and in this way, a motion picture corresponding to each average value of volumes can be found. After all motion pictures corresponding to average values of volumes during each time period are found, these motion pictures can be combined into a continuous animation, and the motion style of this animation coincides with a volume of the sound that has gone through the sound change processing. At last, the sound that has gone through the sound change processing is incorporated with the animation to form the analog image data. In this way, animation effects and sound effects contained in the obtained analog image data can vividly and correctly reflect the state and mood of the user.

S403: Play the analog image data.

A process of playing the analog image data is a process of playing the sound that has gone through the sound change processing and the corresponding animation at the same time. Different from an existing communication manner, the present disclosure vividly presents a real state of a user. However, a speed and tone of a sound of each person are different from others. Therefore, synchronization and a match between a sound and a motion need to be achieved when the analog image data is played. For example, a change in a mouth shape is basically synchronous with the speaking speed of a user when the user speaks, and the speed of a body motion also needs to be synchronous with and match the speaking speed.

During specific implementation, when the sound that has gone through the sound change processing is played, an average value of volumes or tones during each time period may be sampled at the same time, and then a corresponding motion picture is synchronously displayed according to the sampled average value of volumes or tones during each time period. In this way, a match between the sound and the motion may be achieved.

Besides, in start and end phases of playing the analog image data, some fixed animation motions can be added. These motions are irrelevant to the sound of the user and are just animation motions that fixedly exist to make the animation interesting.

Figure 5:
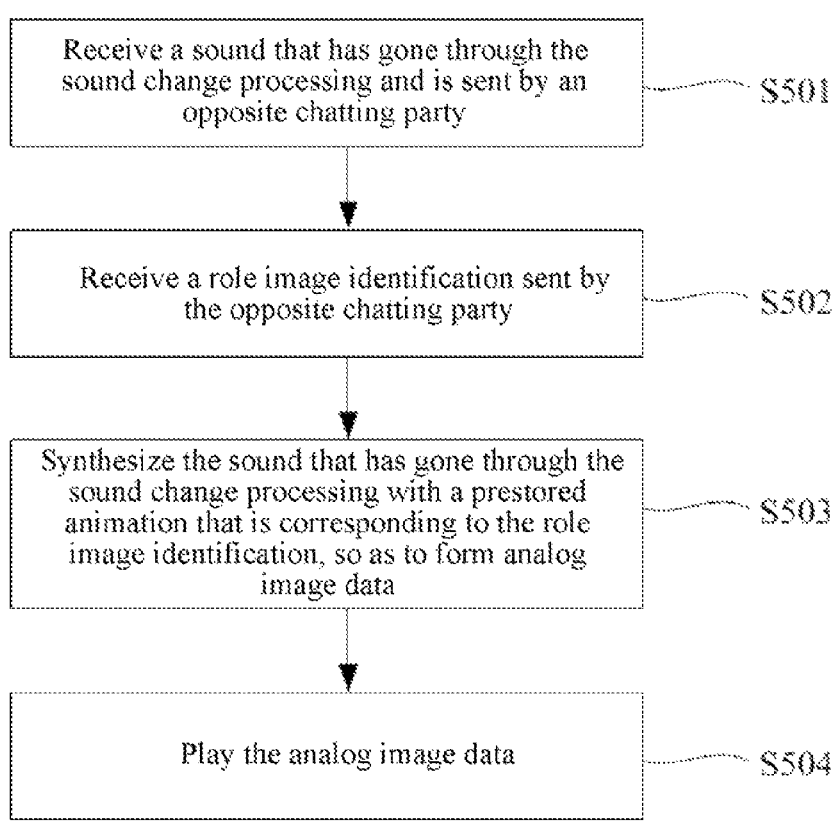
FIG. 5 is a flowchart of another communication information processing method according to an embodiment of the present invention.

Referring to FIG. 5, FIG. 5 is a flowchart of another communication information processing method according to an embodiment of the present invention. The method includes the following steps:

S501: Receive a sound that has gone through sound change processing from a to-be-communicated party.

S502: Receive a role image identification sent from the communication object.

S503: Synthesize the sound with a pre-stored animation that corresponds to the role image identification, so as to form analog image data.

S504: Play the analog image data.

Embodiment 4 differs from Embodiment 3 in that: an animation image that a user wants to show can be selected by using a role image identification sent from a to-be-communicated party, where each role image identification corresponds to one pre-stored animation image, which also makes communication content more colorful.

Figure 6:
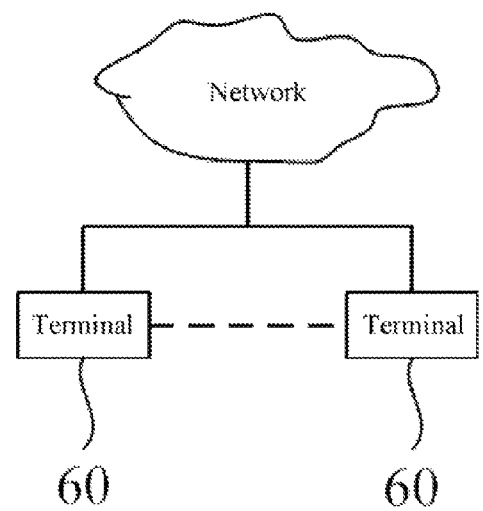
FIG. 6 is a structural diagram of an instant messaging system according to an embodiment of the present invention.

The present disclosure further provides an instant massaging system. Referring to FIG. 6, the system includes at least two terminals 60 that are connected to each other via a network, where the terminals 60 can communicate with each other in an analog image manner which combines an animation and a sound effect.

Figure 7:
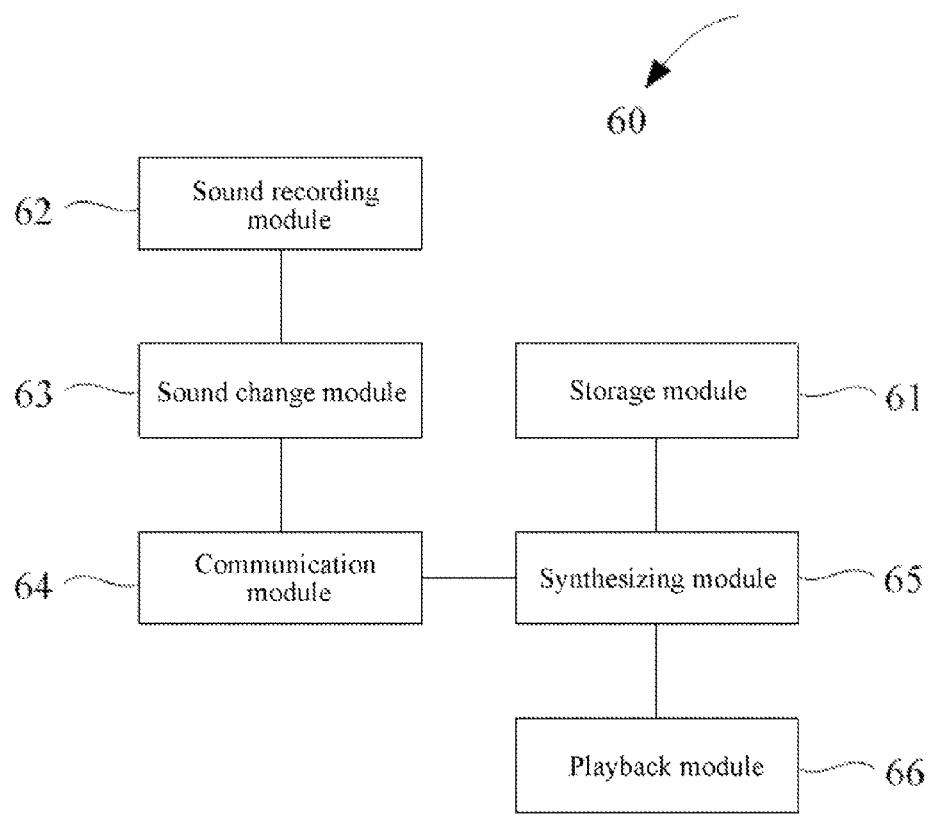
FIG. 7 is a structural diagram of a terminal according to an embodiment of the present invention.

Referring to FIG. 7, FIG. 7 is a structural diagram of a terminal according to an embodiment of the present invention. The terminal includes a storage module 61, a sound recording module 62, a sound change module 63, a communication module 64, a synthesizing module 65, and a playing module 66, where the sound change module 63 is connected to the sound recording module 62, the communication module 64 is separately connected to the sound change module 63 and the synthesizing module 65, and the storage module 61 and the playing module 66 are both connected to the synthesizing module 65.

When the terminals 60 communicate with each other (description is given herein by using an example in which communication information is transferred between two terminals 60 once), a user records a sound by using the sound recording module 62 first, where the sound recording module 62 may be a microphone. Certainly, a user may also record a sound in advance (for example, some common chatting statements) and store the sound in a local database. In this way, the recorded sound can be directly selected and used, thereby improving communication efficiency.

After sound recording is complete, sound change processing is performed by using the sound change module 63. An audio processing library (Soundtouch) is preferably used to perform the sound change processing. Soundtouch mainly implements three functions of varying a rate, varying a tone, and varying a rate and tone at the same time, can perform a real-time operation on a media stream, and can also perform an operation on an audio file. Three parameters of the Soundtouch, such as, a rate, tempo, and pitch may be adjusted, thereby changing the sound of the user to simulate some special sounds. For example, if the parameter pitch is adjusted to 0.8, a low and slow sound of cattle and bears can be simulated; and if the parameter pitch is adjusted to 1.2, a loud sound of chicken can be simulated. The user can simulate a suitable sound according to a current mood or state, so that the sound may become more personalized and vivid.

After the sound change is complete, the sound can be sent to another terminal 60 by using the communication module 64. After receiving the sound that has gone through the sound change processing, a communication module 64 of the another terminal 60 transfers the sound to the synthesizing module 65 for processing. The synthesizing module 65 synthesizes the sound that has gone through the sound change processing with an animation stored in the storage module 61, so as to form analog image data. The synthesized sound and animation need to be consistent with each other, and a volume or tone of the sound can be used as a reference to find a suitable animation by matching. For example, when the sound volume of the user is large and the tone is high, an animation with an exaggerated motion can be selected; and when the sound volume of the user is small and the tone is low, an animation consistent with this style can be selected, so as to simulate a real scenario during communication as closely as possible.

After synthesis is complete, the analog image data may be transferred to the playing module 66 for playing. A process of playing the analog image data is a process of playing the sound that has gone through the sound change processing and the corresponding animation at the same time. So far, one transmission of communication data is complete. Different from an existing communication manner, the present disclosure vividly presents a real state of a user.

It should be noted that because data volume of animations is large, network traffic needed to transmit the animations is large, and a long sending response time is also needed, in this embodiment, after recording a sound, one terminal transmits the sound that has gone through sound change processing to the other terminal, and the other terminal completes synthesis of sounds and animations. This preferred data transmission manner also solves the problem that a longer time and more traffic are needed during sending of the complete animations plus sounds. However, the present disclosure is not limited thereto. In a case in which network bandwidth is ample, synthesis of sounds and animations can be completed by one terminal, and then the analog image data is transmitted to the other terminal directly for playing. In this situation, because the sound recording and the synthesis of sounds plus animations are performed by one same terminal, matching sounds with animations may be easier, and a dynamic animation (a Gif dynamic picture) may even be used as a reference to find a suitable sound by matching. There are multiple synthesis forms.

Additionally, in start and end phases of playing the analog image data, some fixed animation motions can be added. These motions are irrelevant to the sound of the user and are just animation motions that fixedly exist to make the animation interesting.

Figure 8:
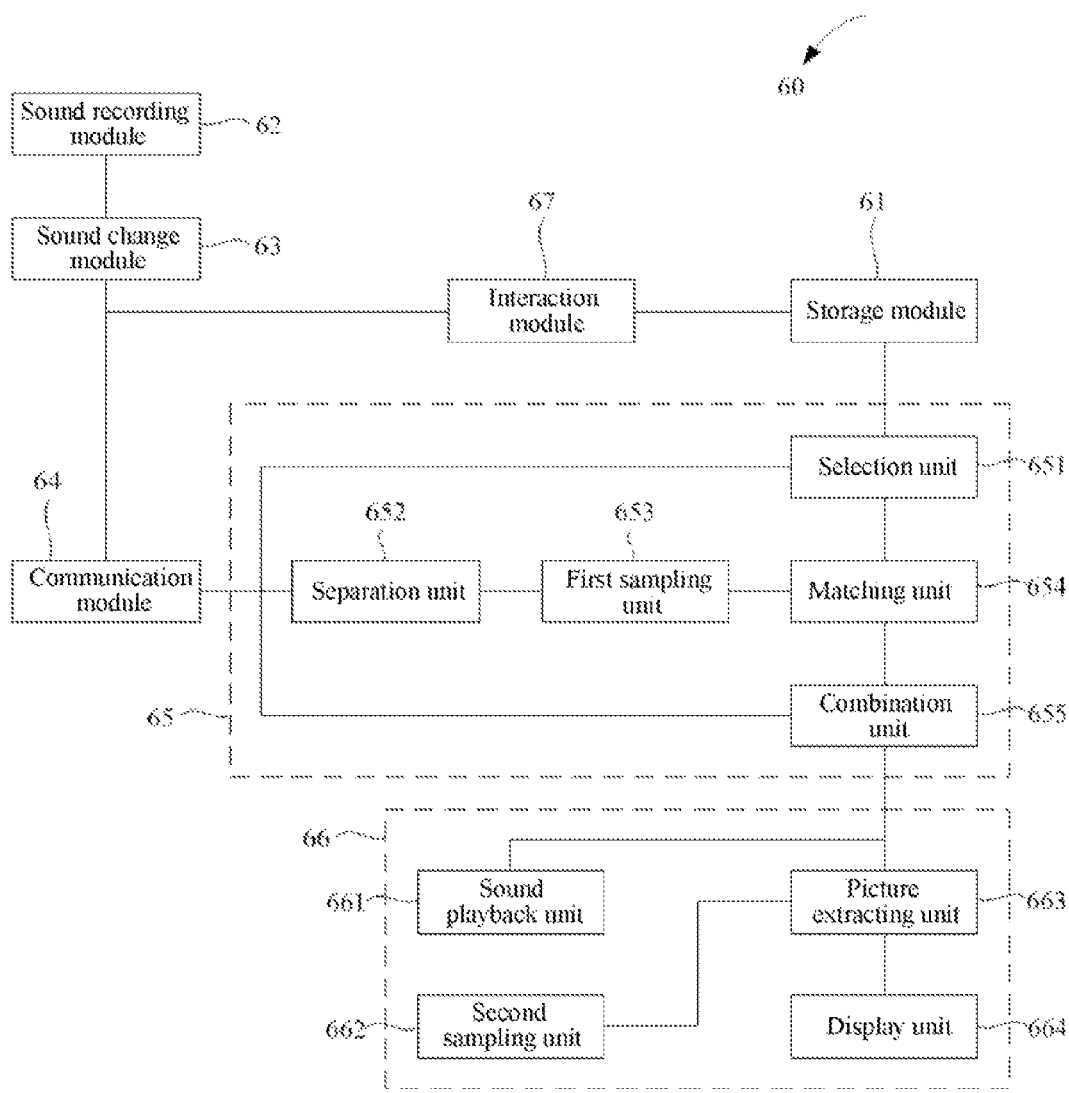
FIG. 8 is a structural diagram of another terminal according to an embodiment of the present invention.

Referring to FIG. 8, FIG. 8 is a structural diagram of a more detailed terminal according to an embodiment of the present invention. Compared with FIG. 7, an interaction module 67 is added to a terminal 60 in this embodiment, where the interaction module 67 is separately connected to the communication module 64 and the storage module 61 and is configured to receive a role image identification selected by a user, where the role image identification corresponds to at least one of the animations stored in the storage module 61. Animation images stored in the storage module 61 may be diversified. Therefore, in one terminal, the user may select an animation image that the user wants to show to the other party by using the role image identification input by the interaction module 67, and then send the role image identification together with the sound that has gone through the sound change processing to the other terminal by using the communication module 64; the other terminal finds a corresponding animation thereof in the storage module 61 according to the role image identification; and the synthesizing module 65 synthesizes the sound and the animation to form analog image data.

The synthesizing module 65 in this embodiment includes a selection unit 651, a separation unit 652, a first sampling unit 653, a matching unit 654, and a combination unit 655, where the selection unit 651 is separately connected to the communication module 64 and the storage module 61, the separation unit 652 is connected to the communication module 64, the first sampling unit 653 is connected to the separation unit 652, the matching unit 654 is separately connected to the first sampling unit 653 and the selection unit 651, and the combination unit 655 is separately connected to the matching unit 654 and the playing module 66.

The synthesizing module 65 in this embodiment uses a volume or tone of a sound as a reference to find a suitable animation by matching. To achieve consistency between the sound and the animation, a matching rule may be defined first: it is assumed that one of the animations may be divided into N motion pictures and a motion style of each motion picture is different from others; if a corresponding animation is selected according to the volume, a volume upper limit Volmax may be set; in addition, volumes from 0 to Volmax are divided into N sections with the same number as the motion pictures and are numbered from 1 to N, and then the N motion pictures are each made to correspond to a different volume, where a motion picture with a smaller motion range corresponds to a smaller volume.

During actual operations, the selection unit 651 first selects, according to the role image identification received by the communication module 64, a picture group (e.g., an animation composed of N pictures and corresponding to the role image identification) from the storage module 61. in addition, the separation unit 652 divides the sound that has gone through the sound change processing and is received by the communication module 64 into multiple time periods; and the first sampling unit 653 samples an average value of volumes during each time period, where each average value of volumes may be equal or the closest to a volume point in the foregoing defined rule. The matching unit 654 acquires, according to the average value of volumes or tones during each time period, a motion picture corresponding to each time period in the picture group selected by the selection unit 651. After all motion pictures corresponding to average values of volumes during each time period are found, the combination unit 655 combines these motion pictures into a continuous animation, where the motion style of this animation coincides with a volume of the sound that has gone through the sound change processing. At last, the combination unit 655 incorporates the sound that has gone through the sound change processing with the animation to form the analog image data. In this way, animation effects and sound effects contained in the obtained analog image data can vividly and correctly reflect the state and mood of the user.

A speed and tone of a sound of each person are different from others. Therefore, synchronization and a match between a sound and a motion need to be achieved when the analog image data is played. For example, a change in a mouth shape is basically synchronous with the speaking speed of a user when the user speaks, and the speed of a body motion also needs to be synchronous with and match the speaking speed. Therefore, the playing module 66 in this embodiment further includes a sound playing unit 661, a second sampling unit 662, a picture extracting unit 663, and a display unit 664, where the sound playing unit 661 is connected to the combination unit 655, the second sampling unit 662 is connected to the sound playing unit 661, the picture extracting unit 663 is separately connected to the combination unit 655 and the second sampling unit 662, and the display unit 664 is connected to the picture extracting unit 663.

During playing, the sound playing unit 661 plays the sound that has gone through the sound change processing, and at the same time, the second sampling unit 662 samples an average value of volumes or tones during each time period. Then, the picture extracting unit 663 extracts a corresponding motion picture according to the average value of volumes or tones during each time period sampled by the second sampling unit 662, and the display unit 664 displays the motion picture synchronously. In this way, consistency and a match between an animation motion and a sound can be achieved.

The present disclosure further provides a terminal that has the same functions and working principles as the terminal structure described in the embodiments shown in FIG. 7 and FIG. 8, which is not described herein again.

The present disclosure further provides one or more storage media containing a computer executable instruction, the computer executable instruction being used for executing an instant messaging method, and the method including the following steps: receiving, by a first terminal, a sound recorded by a user, and performing sound change processing on the sound recorded by the user; sending, by the first terminal, the sound to a second terminal; synthesizing, by the second terminal, the received sound with a pre-stored animation, so as to form analog image data; and playing, by the second terminal, the analog image data.

The present disclosure further provides one or more storage media containing a computer executable instruction, the computer executable instruction being used for executing a communication information processing method, and the method including the following steps: receiving a changed sound after sound change processing from an to-be-communicated party; synthesizing the changed sound with a pre-stored animation, so as to form analog image data; and playing the analog image data.

The present disclosure provides an entirely new communication medium, which uses an entirely new communication manner including an expression animation and also including a personalized sound, and is shown in the form of an analog image by intelligent processing, which can vividly and correctly reflect a state and mood of a user.

The present disclosure automatically matches a sound recorded by the user with an image selected by the user to form analog image data, which simplifies user operations. The present disclosure can transmit a sound that has gone through sound change processing only in a network, and then correspondingly match a received sound with a local animation, which greatly saves traffic during network transmission, shortens a sending response time, and improves communication efficiency.

The above descriptions are merely preferred embodiments of the present invention, and are not intended to limit the present disclosure in any form. Although the present disclosure has been disclosed above through the preferred embodiments, the embodiments are not intended to limit the present disclosure. A person skilled in the art can make some equivalent variations, alterations or modifications to the above-disclosed technical content without departing from the scope of the technical solutions of the present disclosure to obtain equivalent embodiments. Any simple alteration, equivalent change or modification made to the above embodiments according to the technical essence of the present disclosure without departing from the content of the technical solutions of the present disclosure shall fall within the scope of the technical solutions of the present disclosure.

What is claimed is:

1. An instant messaging method, comprising:
receiving, by a first terminal, a sound recorded by a user;
performing, by the first terminal, sound change processing on the sound recorded by the user to provide a changed sound;
dividing the changed sound into multiple time periods;
sampling at least one of an average volume or an average tone for each of the multiple time periods of the changed sound;
assigning matching rules between a plurality of pre-stored motion pictures and at least one of multiple sound volumes and multiple sound tones, each motion picture having at least one of a corresponding sound volume and a corresponding sound tone;
according to the matching rules, obtaining multiple pre-stored motion pictures corresponding to at least one of the sampled volume and the sampled tone for each of the multiple time periods of the changed sound; and
sending, by the first terminal, the changed sound after the sound change processing to a second terminal for the second terminal to synthesize the changed sound with a pre-stored animation in the second terminal to form analog image data and to play the analog image data, the pre-stored animation being the multiple motion pictures combined in accordance with the multiple time periods of the changed sound.

2. The instant messaging method according to claim 1, wherein the step of receiving, by the first terminal, the sound recorded by the user, and performing sound change processing on the sound recorded by the user comprises:
performing, by using an audio processing library, the sound change processing on the sound recorded by the user.

3. The instant messaging method according to claim 1, wherein:
before the step of sending, by the first terminal, the changed sound to the second terminal, the method further comprises: receiving, by the first terminal, a role image identification selected by the user; and
the step of sending, by the first terminal, the changed sound to the second terminal comprises: sending, by the first terminal, the changed sound and the role image identification to the second terminal for the second terminal to synthesize the changed sound with a pre-stored animation that corresponds to the role image identification, so as to form the analog image data.

4. The instant messaging method according to claim 3, wherein the second terminal synthesizes the changed sound with the pre-stored animation that corresponds to the role image identification, so as to form the analog image data further comprises:
selecting, according to the role image identification, a pre-stored picture group;
wherein the plurality of pre-stored motion pictures assigned in the matching rules are obtained from the pre-stored picture group corresponding to the role image identification.

5. The instant messaging method according to claim 4, wherein the second terminal plays the analog image data by:
playing the changed sound after the sound change processing, and sampling the average volume or the average tone during each of the multiple time periods at the same time; and
synchronously displaying a corresponding motion picture according to the sampled volume or the sampled tone during each of the multiple time periods.

6. A communication information processing method, comprising:
receiving a changed sound after a sound change processing from a to-be-communicated party;
dividing the changed sound into multiple time periods;
sampling at least one of an average volume or an average tone for each of the multiple time periods of the changed sound;
assigning matching rules between a plurality of pre-stored motion pictures and at least one of multiple sound volumes and multiple sound tones, each motion picture having at least one of a corresponding sound volume and a corresponding sound tone;
according to the matching rules, obtaining multiple pre-stored motion pictures corresponding to at least one of the sampled volume and the sampled tone for each of the multiple time periods of the changed sound; and
synthesizing the changed sound with a pre-stored animation, so as to form analog image data, the pre-stored animation being the multiple motion pictures combined in accordance with the multiple time periods of the changed sound; and
playing the analog image data.

7. The communication information processing method according to claim 6, wherein the sound change processing is performed on a sound by using an audio processing library to provide the changed sound.

8. The communication information processing method according to claim 6, wherein before the step of synthesizing the changed sound with a pre-stored animation, so as to form the analog image data, the method further comprises: receiving a role image identification from the to-be-communicated party; and the step of synthesizing the changed sound with the pre-stored animation, so as to form the analog image data comprises: synthesizing the changed sound with a pre-stored animation that corresponds to the role image identification, so as to form the analog image data.

9. The communication information processing method according to claim 8, wherein the step of synthesizing the changed sound with a pre-stored animation that corresponds to the role image identification, so as to form the analog image data comprises:

selecting a pre-stored picture group according to the role image identification;
wherein the plurality of pre-stored motion pictures assigned in the matching rules are obtained from the pre-stored picture group corresponding to the role image identification.

10. The communication information processing method according to claim 9, wherein the step of playing the analog image data comprises:

playing the changed sound after the sound change processing, and sampling the average volume or the average tone during each of the multiple time periods at the same time; and
synchronously displaying a corresponding motion picture according to the sampled volume or the sampled tone during each of the multiple time periods.

11. The communication information processing method according to claim 8, further comprising:

obtaining a maximum volume among the sampled volumes for the multiple time periods of the changed sound;
dividing volumes ranging from 0 to the maximum volume into N volume sections, wherein N equals a quantity of the plurality of pre-stored motion pictures; and
assigning the matching rules by assigning one-to-one correspondence for the N volume sections and the plurality of pre-stored motion pictures.

12. The communication information processing method according to claim 11, wherein:

when assigning the one-to-one correspondence for the N volume sections and the plurality of pre-stored motion pictures, a motion picture with a smaller motion range corresponds to a smaller volume.

13. An instant messaging system, comprising:

at least two terminals connected to each other via a network, each terminal comprising:
a storage module, configured to store multiple animations, each animation includes a motion picture group;
a sound recording module, configured to receive a sound recorded by a user;
a sound change module, configured to perform sound change processing on the sound recorded by the user to provide a changed sound;
a communication module, configured to send the changed sound after the sound change processing to another terminal or receive a changed sound from another terminal;
a synthesizing module, configured to:
divide the changed sound into multiple time periods;
sample at least one of an average volume or an average tone for each of the multiple time periods of the changed sound;
assign matching rules between a plurality of motion pictures in the storage module and at least one of multiple sound volumes and multiple sound tones, each motion picture having at least one of a corresponding sound volume and a corresponding sound tone;
according to the matching rules, obtain multiple pre-stored motion pictures corresponding to at least one of the sampled volume and the sampled tone for each of the multiple time periods of the changed sound; and
synthesize the changed sound from the another terminal with the multiple animations stored in the storage module, so as to form analog image data, the pre-stored animation being the multiple motion pictures combined in accordance with the multiple time periods of the changed sound; and
a playing module, configured to play the analog image data.

14. The instant messaging system according to claim 13, wherein the sound change module uses an audio processing library to perform the sound change processing on the sound recorded by the user.

15. The instant messaging system according to claim 13, wherein each module further comprises:

an interaction module, configured to receive a role image identification selected by the user, the role image identification being corresponding to at least one of the multiple animations stored in the storage module, wherein:
the communication module configured to send, when communicating with the another terminal, the role image identification together with the changed sound to the another terminal, or receives a role image identification and the changed sound from the another terminal; and
the synthesizing module configured to synthesize, during forming of the analog image data, the changed sound from the another terminal with the animation that is stored in the storage module and corresponds to the role image identification received from the another terminal, so as to form the analog image data;
wherein the plurality of motion pictures assigned in the matching rules are from the picture group of the animation corresponding to the role image identification.

16. The instant messaging system according to claim 15, wherein the display module further comprises:

a sound playing unit, configured to play the changed sound that has gone through the sound change processing and is received from the another terminal;
a second sampling unit, configured to sample the average volume or the average tone during each of the multiple time periods at the same time the sound playing unit plays the sound;
a picture extracting unit, configured to synchronously extract, according to the sampled volume or the sampled tone during each of the multiple time periods, a corresponding motion picture; and
a display unit, configured to synchronously display the motion picture extracted by the picture extracting unit.

* * * * *